(12) United States Patent
Floyd (10) Patent No.: US 6,614,920 B2
(45) Date of Patent: Sep. 2, 2003

(54) GOD FINGERPRINT OPERATED IGNITION SWITCH AND ENTRY SYSTEM

(76) Inventor: Herbert Ray Floyd, P.O. Box 286-779, New York, NY (US) 10128

(*) Notice: Subject to any disclaimer, the term of this patent is extended or adjusted under 35 U.S.C. 154(b) by 0 days.

(21) Appl. No.: 10/060,886

(22) Filed: Jan. 30, 2002

(65) Prior Publication Data

US 2003/0002716 A1 Jan. 2, 2003

Related U.S. Application Data

(63) Continuation-in-part of application No. 09/503,919, filed on Feb. 11, 2000, now abandoned, which is a continuation-in-part of application No. 08/980,485, filed on Nov. 28, 1997, now abandoned, and a continuation-in-part of application No. 08/390,484, filed on Feb. 17, 1995, now abandoned.

(51) Int. Cl.$^7$ .................................................. G06K 9/00
(52) U.S. Cl. ..................................... 382/124; 340/5.53
(58) Field of Search ................................ 382/115–127; 356/71; 902/3, 6; 713/186, 200; 340/5.53, 5.83; 707/6

(56) References Cited

U.S. PATENT DOCUMENTS

| | | | | |
|---|---|---|---|---|
| 5,283,431 A | * | 2/1994 | Rhine | 250/229 |
| 5,745,046 A | * | 4/1998 | Itsumi et al. | 340/825.31 |
| 6,078,265 A | * | 6/2000 | Bonder et al. | 340/825.31 |
| 6,100,811 A | * | 12/2000 | Hsu et al. | 340/825.31 |
| 6,271,745 B1 | * | 8/2001 | Anzai et al. | 340/5.53 |
| 6,376,930 B1 | * | 4/2002 | Nagao et al. | 307/10.2 |

FOREIGN PATENT DOCUMENTS

JP       6-212842 A    *  8/1994    ........... E05B/49/00

* cited by examiner

Primary Examiner—Brian Werner (57) ABSTRACT

A fingerprint entry and engine starting system, including a computerized video recorder, and transmitter installed in a driver's door of a vehicle housing a transparent shield. The recorder is perpendicular via position under this transparent shield. Since this shield is installed in the vehicle's door handle, a legal user will press the shield upon its left side portion, such as to start the vehicle's engine. As a result, whenever the righthand portion upon the shield is pushed by a legal user, the vehicle's door-locks are freed. This is done when the recorder is actuated whereas a fingerprint of a user is transformed from optical information to computer data when the shield is pressed. This data is transmitted and compared with preset data, such that when this preset data stored in a memory matches with transformed data, coils via actuators for releasing the vehicle's door-locks are actuated. An ignition switch actuates a motor of an engine starter also, as a match is defined, which drives the starter and starts the engine of the vehicle. This is accomplished, when an activating signal is outputted from a CPU. This CPU defines the memory whereby outputting the activating signal only, whenever the shield is pushed by a legal user for actuating two pushbutton switches. Four fingerprint input pushbutton switches outwardly upon the door causes one power window, a heater, a trunk and a hood to be operated also, before entering the vehicle without a key.

16 Claims, 12 Drawing Sheets

GOD FINGERPRINT OPERATED IGNITION SWITCH AND ENTRY SYSTEM

CROSS-REFERENCES TO RELATED APPLICATION

This application is a continuation-in-part of application Ser. No. 09/503,919, filed on Feb. 11, 2000, now abandoned, which is a continuation-in-part of application Ser. No. 08/980,485 filed on Nov. 28, 1997, now abandoned, and application Ser. No. 08/390,484 filed on Feb. 17, 1995, now abandoned.

BACKGROUND OF THE INVENTION

1. Field of the Invention

The present invention appertains to automobiles and specifically, to a driver's door containing a recorder. This computerized video recorder is thus perpendicular on position beneath a transparent shield. Since this shield is installed in the vehicle's door handle, a user will press the shield so that the recorder is actuated while a fingerprint of the user is transformed from optical information to computer data. As the data is transmitted and compared with preset stored data, so that when this preset data stored in a memory matches with transformed data or a signal, coils via actuators for freeing the vehicle's door-locks and a motor of a starter for causing an engine starter to be driven each of which is actuated. As this is completed only when an activating signal is outputted from a control system, the control system defines the memory.

2. Description of the Prior Art

Many prior art devices and methods exist to attempt to prevent the use of a mechanical key. As these devices are worthwhile, they will not start an automobile's engine having fingerprints inputted in an optical system by which an engine starter is driven, and legal entry is provided.

Fingerprint entry, and fingerprint engine starting, thus, is a revolutionary 21st Century reality for which a key is not needed to unlock a vehicle, or start its engine before entering through a fingerprint operated driver's door, seeing GOD created unmatchable sets of fingerprints for all hands.

SUMMARY OF THE INVENTION

Accordantly, it is a principle object of the modern invention to produce a fingerprint entry, and engine starting system whereby a fingerprint door shield is provided, this is for gaining legal entry, and for starting a vehicle's engine.

On the other hand, to accomplish the foregoing, and other objects, a fingerprint entry and engine starting system about a vehicle according to the present invention comprises: a first input system for inputting legal fingerprints through an optical system to become computer data, or a signal, and a way for an image sensor to output a fingerprint signal and/or fingerprint data, a LED, and a way for illuminating the input system, control system having a fingerprint memory, such that the control system outputs one commandment signal, only, when the fingerprint signal matches by a preset fingerprint signal stored in the memory, a fingerprint door lock system, thereby including actuators actuating in a vehicle as the fingerprint signal matches with the preset fingerprint signal, comparison ways having the fingerprint memory, such that the fingerprint signal is to match with the preset fingerprint signal stored, therein the memory, a motor is to be actuated by reason of an ignition switch and a way for driving an engine starter. The input system defines a transmitter mounted in a driver's door via the vehicle near a first video recorder. The recorder is fixed erectly, below a first input shield, the shield is in a door handle of the vehicle. The recorder has the sensor, and a way to thereby, detect, the input system is to transmit the signal to the memory.

According to another merit regarding the invention, a fingerprint operated ignition switch system in a dashboard, and a door handle defining an input shield comprises: a first recorder, and a transmitter set in a door, a receiving system for receiving a fingerprint signal, or, fingerprint data from the transmitter, one comparison system for comparing a preset fingerprint signal with the fingerprint signal, and a way for outputting a commandment signal, when each fingerprint signal mates with one another for actuating this system, one control system defining a fingerprint memory, so when the fingerprint signal matches about the preset fingerprint signal stored via the memory, an engine starter comprises a system to start its engine, a first unit switch joined via the control system, as the control system outputs a unit signal via the transmitter, a halve regarding a first input shield uses a system to start the engine via the commandment signal, the transmitter having a way for transmitting the fingerprint signal in reply to the unit signal, a second unit switch joining the control system, so that the control system output a unit signal by way of the transmitter, a righthand halve of the input shield includes a way for providing legal entry, a second input system defining a dashboard to input legal fingerprints including a system to start the engine defines a third input switch. The receiving system comprises three antennas, and a system to transmit and receive signals about the transmitter. The receiving system, thereby includes a controller having a CPU, the CPU is to out put the commandment signal. The first input shield can be in a door handle, and a second input shield is included in a mid door structure. The first shield, and the second shield have two parts in the handle, and in the door, but appear, as one shield. The recorder is beneath the parts, such, as to cause the engine to start, an ignition key is excluded. The engine includes a way to start via fingerprint input before entry is thereby defined, the parts are upon an outer door. The first reorder having a system to, thereby, copy the input, a second recorder in a dashboard includes a system to copy, also. The second input shield includes the unit switch and a system for thereby driving the starter, the key is omitted. The door is to join four input switches, and a system, such as to power a hood, trunk, heater, and a window upon the outer door.

According to further merit via the new invention, a fingerprint controlled ignition switch input shield cast on a driver's door in a vehicle comprises: a video image converter system for converting a signal from a first video recorder, a third input system having a fourth switch in a vehicle on its door, and a way for inputting a fingerprint image through one optical system, so as to become computer information, a video negative viewer circuit for generating a negative image via a fingerprint signal from the first recorder, a pattern circuit and generator for addressing a memory through a preprogrammed memory for generating a wave-form via the fingerprint signal, and by basis of the negative viewer, a comparator system for, so comparing the fingerprint signal with a preset fingerprint signal, and a way for outputting a commandment signal solely, when such fingerprint signals are to mate with one another, a control system defining the preprogrammed memory, whereby the fingerprint signal is to match thereby the preset fingerprint signal stored in the memory, a motor is to be actuated by way of an ignition switch, thereby, for driving an engine starter thus, by basis of a coil according to the commandment signal. The fourth switch has a way to, thereby turn off the vehicle, the vehicle must have its gear indicator designated via PARK. The memory has a system to store data thereby a transit user, a delete switch, and set time are to delete the data.

BRIEF DESCRIPTION OF THE DRAWINGS

Further objects and advantages given herewith about the present invention will become apparent, however, from the drawings with respect to the preferred embodiments concerning the invention, and the description thereof.

DETAILED DESCRIPTION OF THE PREFERRED EMBODIMENTS

Figure 1:
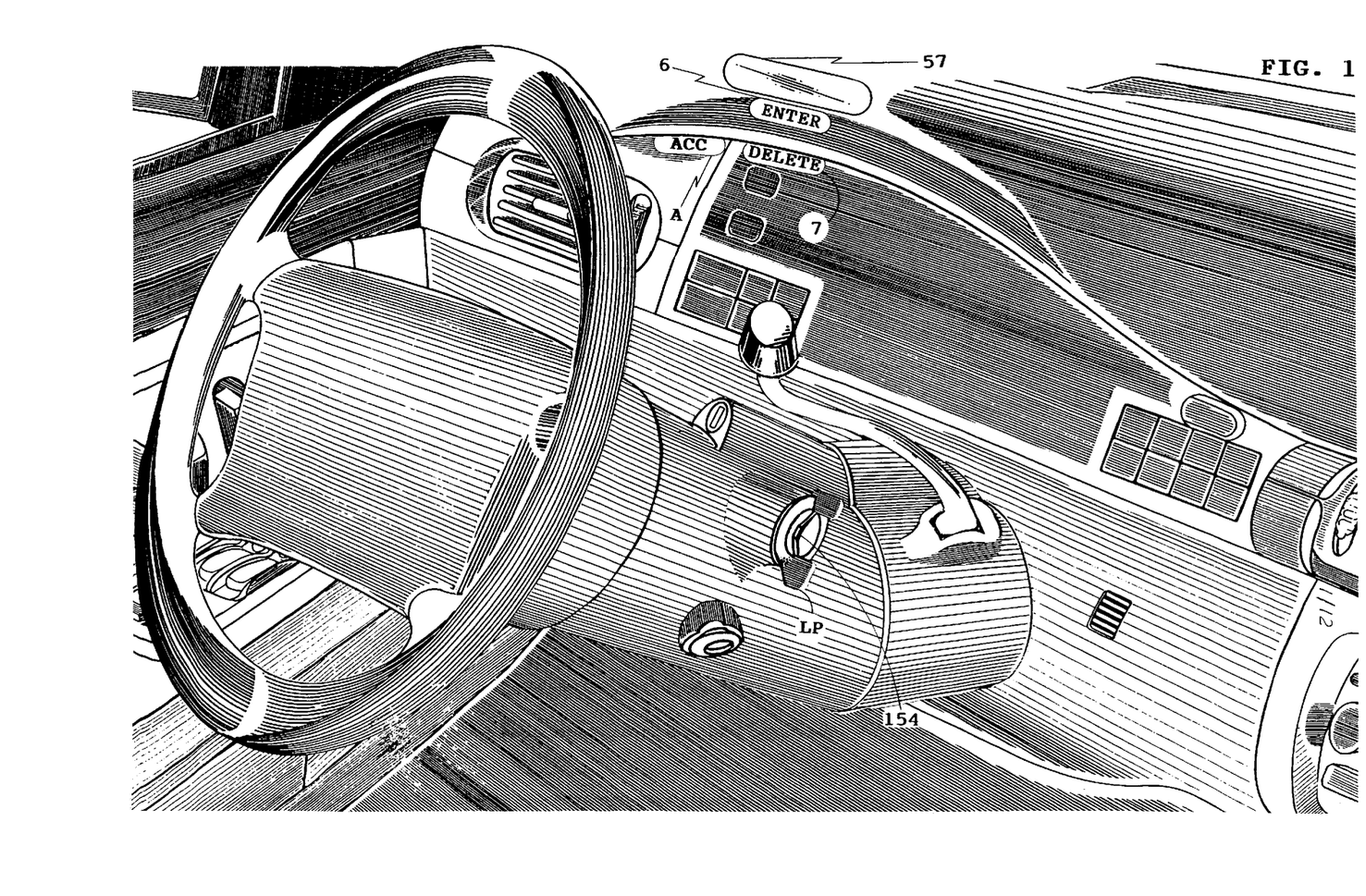
FIG. 1 is a perspective view of a vehicle about its column defining an inner ignition switch of an extended lock.
Figure 2:
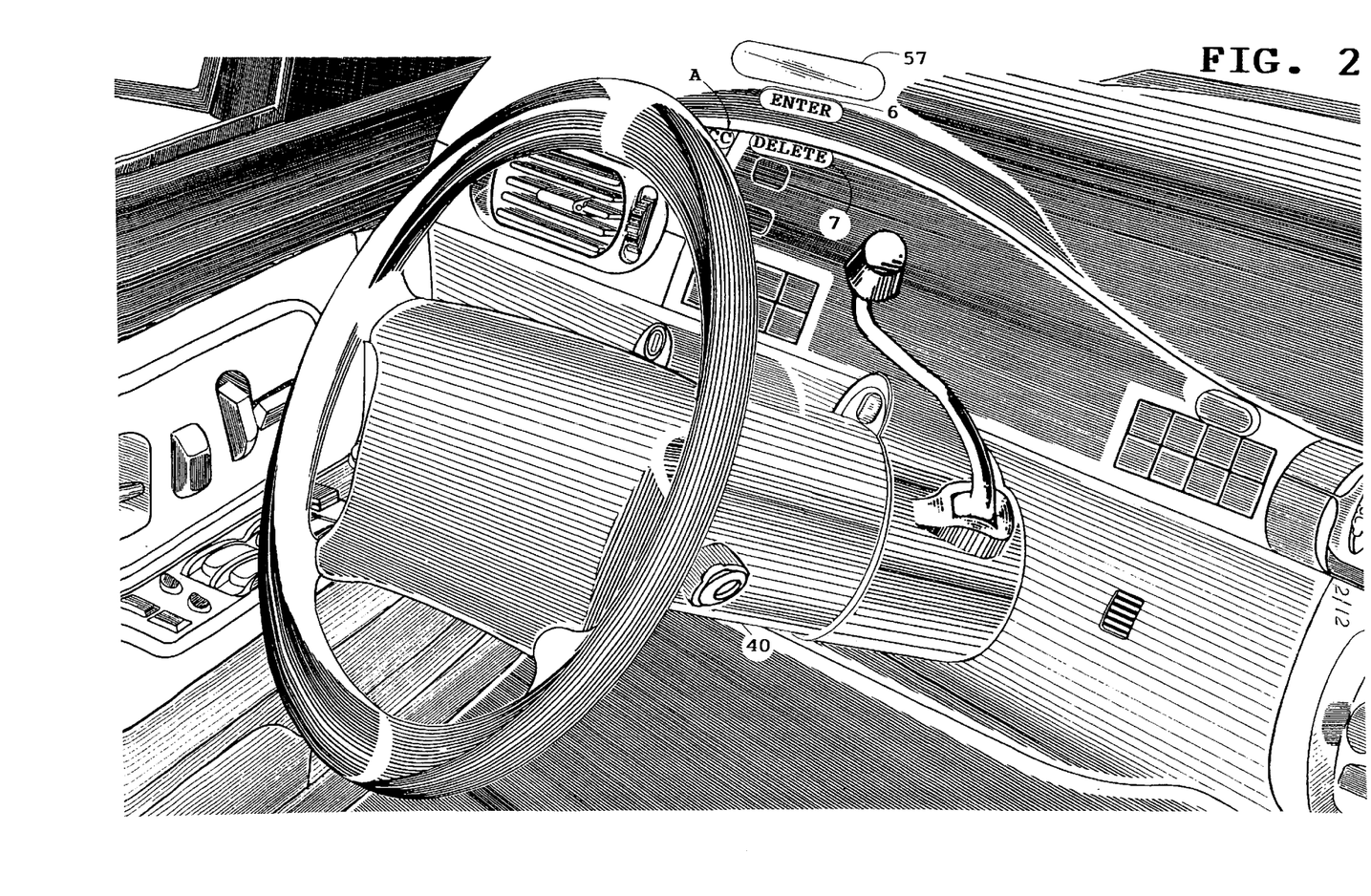
FIG. 2 is a perspective view of a fingerprint input system to start an engine of a vehicle, thereby excluding its ignition lock and key, while a fingerprint shield is pressed.
Figure 3:
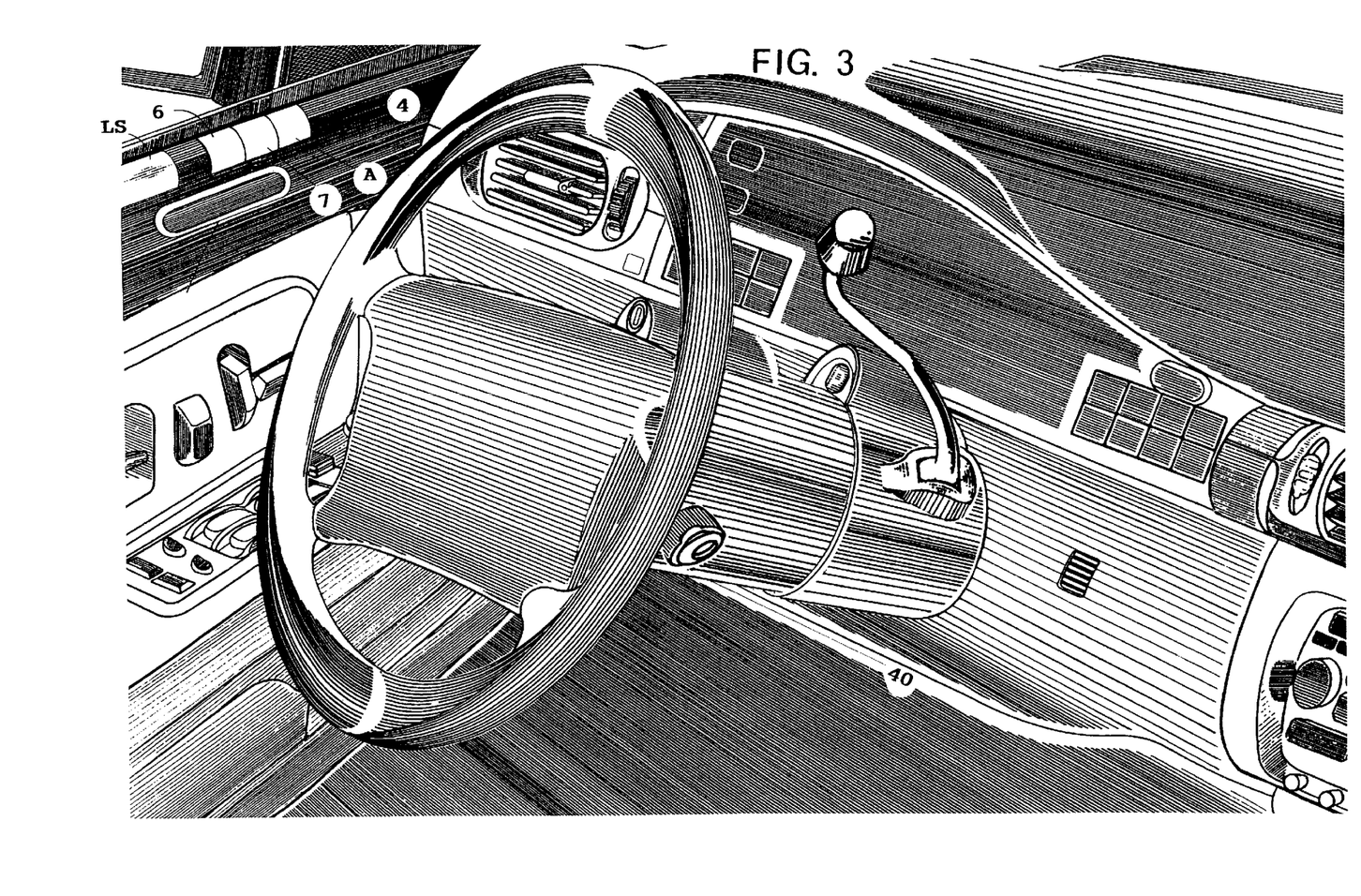
FIG. 3 is a perspective view defining a fingerprint input system, which excludes an ignition key, yet conceals an ignition switch, as this input system is defined upon a door.

FIGS. 2 and 3 include a column defined by a reference numeral 40, which prohibits a conventional ignition lock LP (FIG. 1). The column 40 conceals a conventional ignition switch 154, so as to prevent theft of a vehicle. This also prevents the use of a mechanical key. E.g., the ignition switch and its lines are thus, controlled via fingerprint input through an optical system, and is transformed to computer data, or a fingerprint signal. As this signal is transmitted, compared, and matched with one preset signal, outputs an activating control signal.

With respect to the detailed description of a First embodiment, the present invention will be discussed according to the preferred embodiments. Since there are drawings about the above brief description of the several views, these views will be referred to by specifying the numbers of the figures. The reference to these drawings shall be defined by different parts by use of reference letters or numerals (preferably the latter). This specification will conclude with seventeen new claims, particularly pointing out and distinctly claiming the subject matter, which the applicant regards as his invention.

First Embodiment

Figures 4, 5:
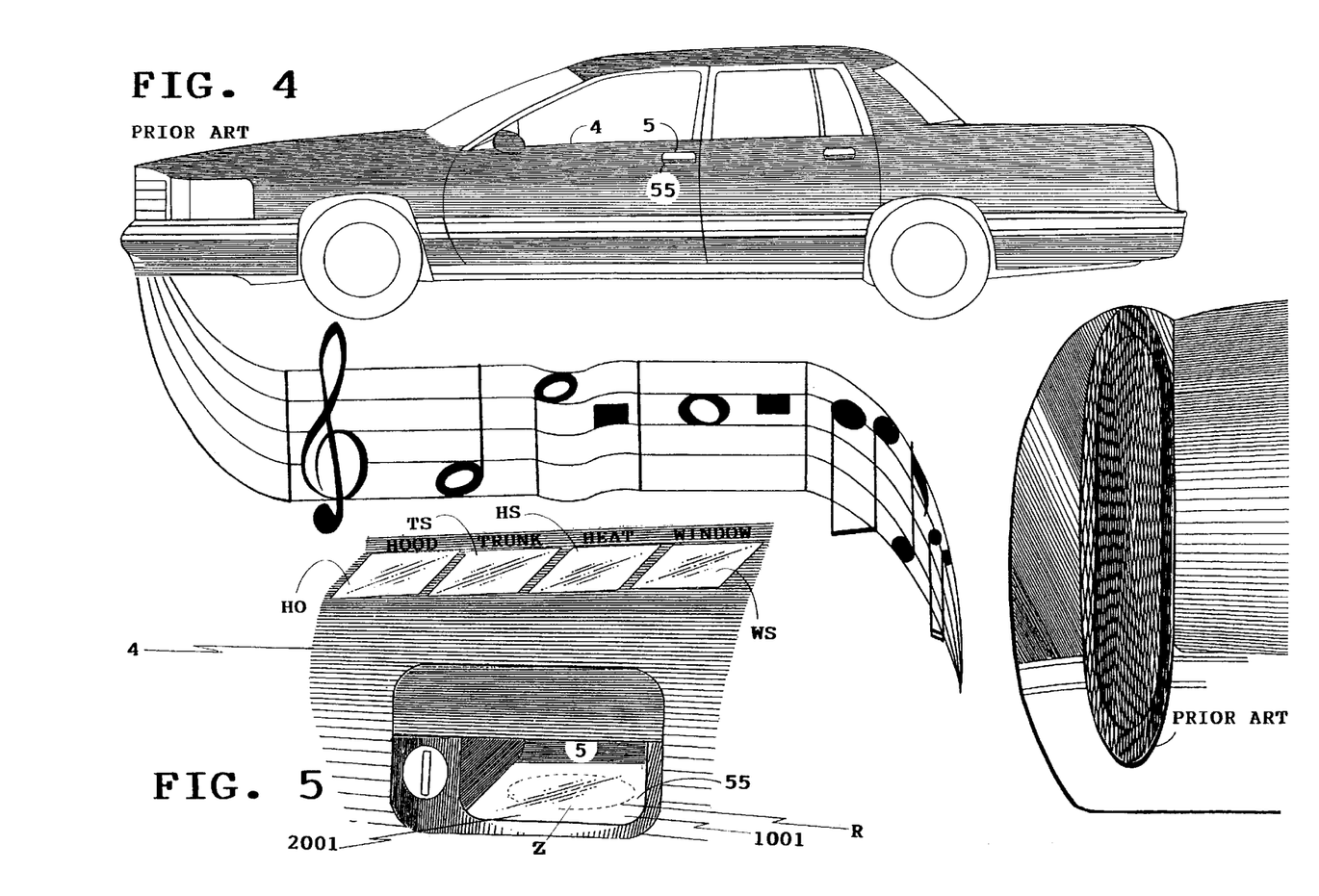
FIG. 4 is a side view via a conventional automobile defining a two part fingerprint entry shield shown in FIG. 5.
FIG. 5 defines a recorder under the shield to start the engine when its left portion is pushed by a user, as four input switches are to power a hood, trunk, heater and window.
Figure 8:
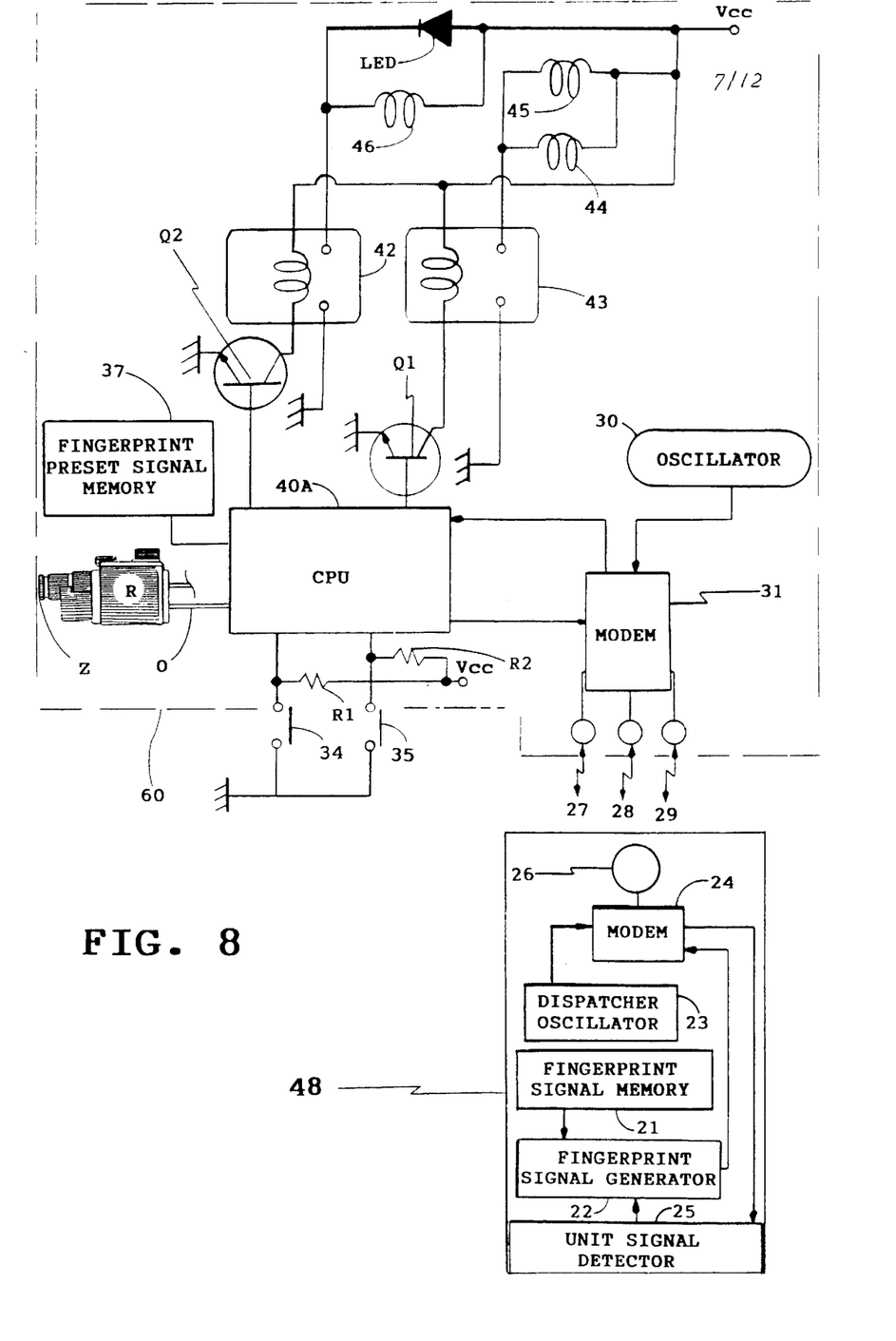
FIG. 8 is a block diagram of a transmitter, and its control circuit to receive signals to be processed via a CPU.

Referring to the drawings, and chiefly, to FIGS. 4, and 8, an input system being shown in FIG. 5 is for inputting fingerprint input into an optical system which is transformed into computer data, or a signal by an image sensor, outputs a fingerprint signal as a LED illuminates a two part shield 55. A recorder R uses an automatic white balance recording system for illuminating all fingerprints to be recorded, also.

Figure 10:
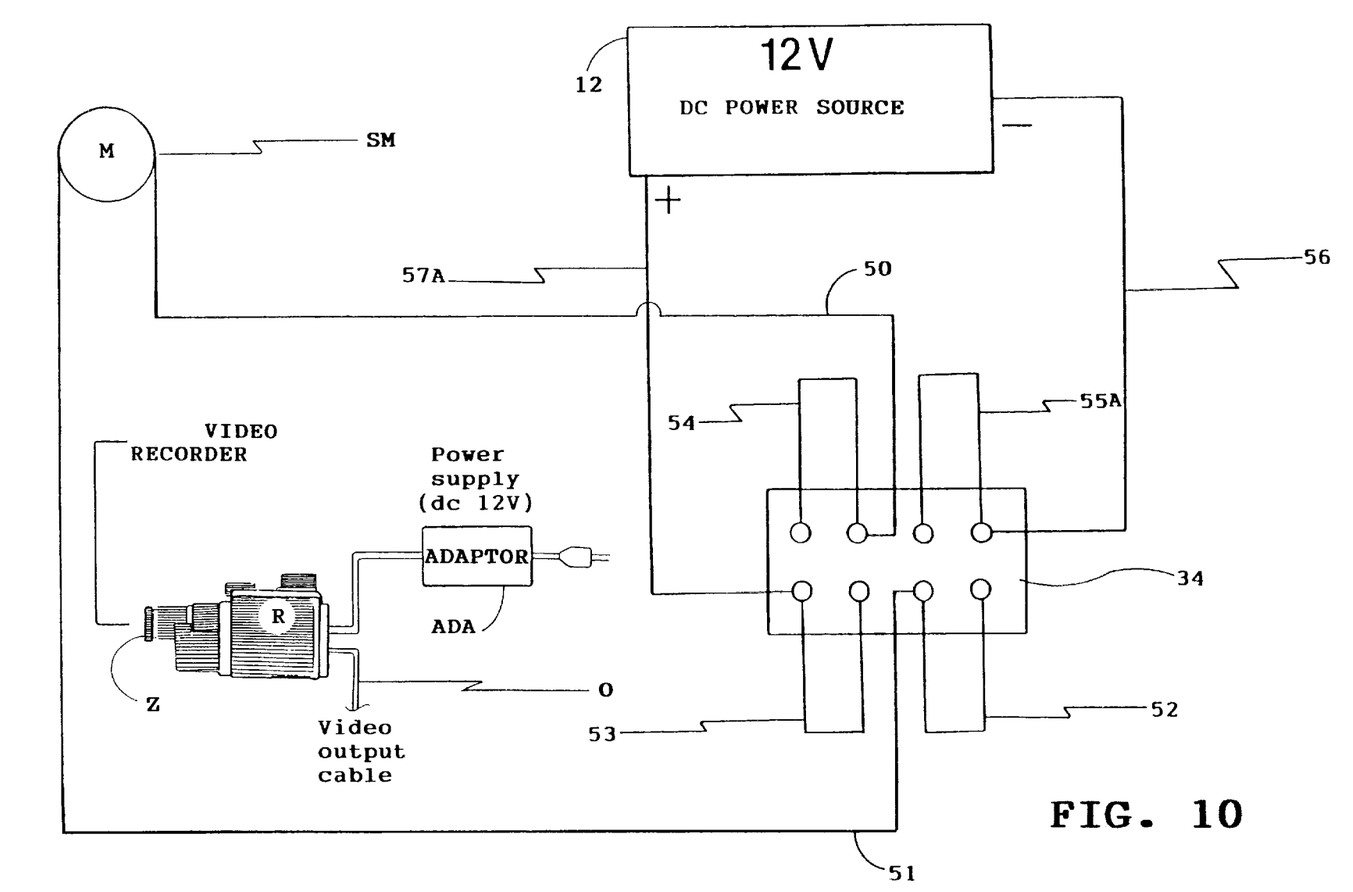
FIG. 10 is a block diagram via a motor circuit, and this recorder to change optical information to computer data.

This video recorder R, which is shown in FIG. 10 is made up about a lens Z, and a pickup device, as a solid state image sensor (MOS, or CCD). The sensor views the fingerprint input, so that when the input is transformed to an electronic signal, a receiving system 27, 28, and 29 receives the signal via a transmitter 48 as a pushbutton 3b is pushed (FIG. 14A).

Figures 13, 14A, 14B:
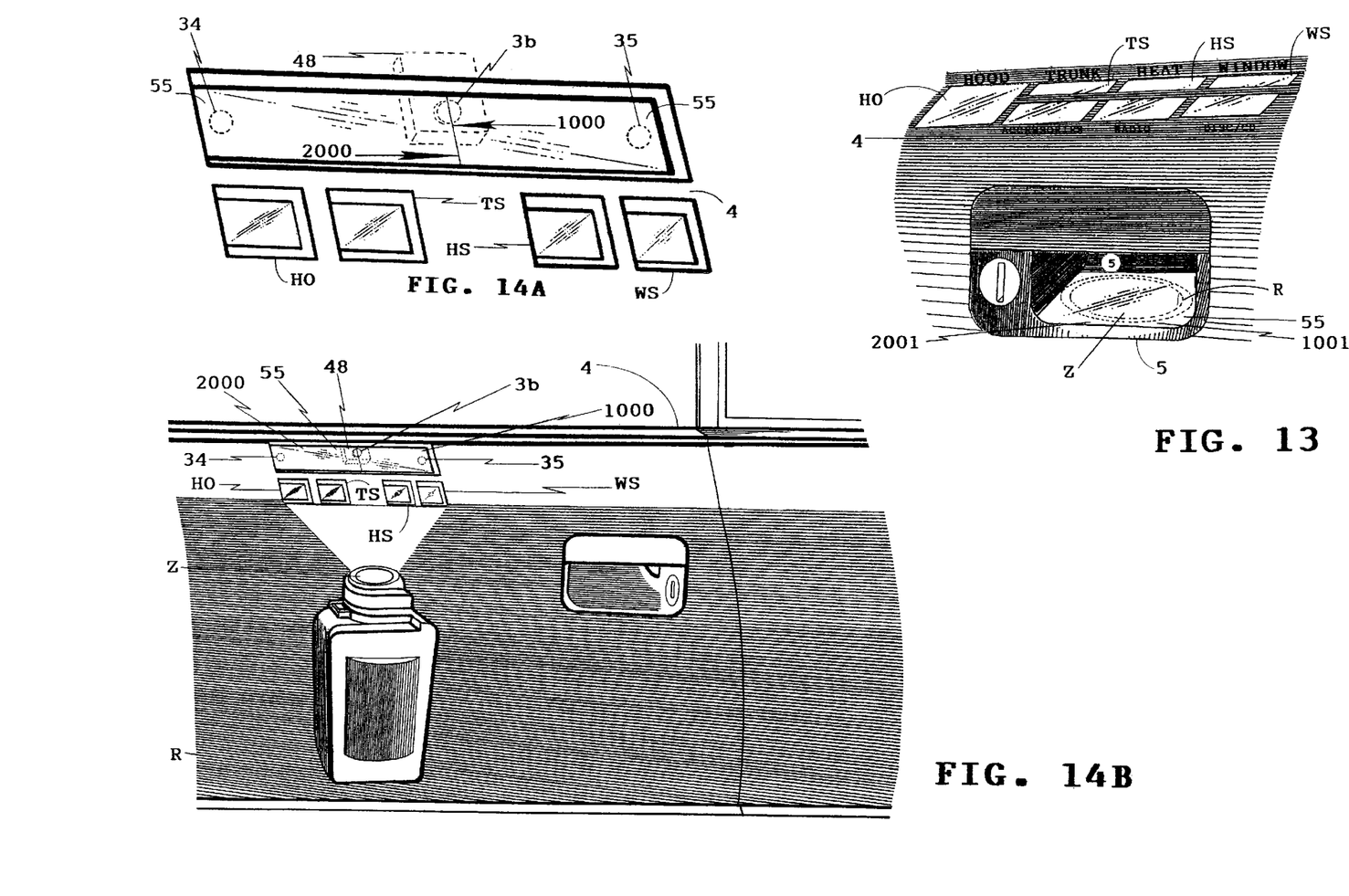
FIG. 13 is a perspective view of the door handle as three additional switches are for (the broadening paragraph)
FIGS. 14A to 14B are side views of a mid door input fingerprint system, and operates according to FIGS. 3, and 7.

As shown in FIG. 14B, the recorder R is positioned, so that its MACRO lens Z (FIGS. 9–10) is adjacently below the input shield 55 regarding an automatic focusing system. This system measures the distance from the bottom of the shield 55 while emitting infrared rays, beneath this shield 55, detects real fingerprint input as the shield 55 is pressed. Now this approves utilization principles of triangulation modes, since infrared rays from an infrared light emitting is shot through a protecting lens to the fingerprint input.

The fingerprint input is hit, and the infrared rays reflect back through a receiving lens as entering the sensor. Since the sensor defines two photodiodes, a signal processing automatic focus control system moves the receiving lens, such as to equalize the light intensity of the two photodiodes.

As a drive pulse generator circuit generates pulses for driving the image sensor and a signal-processing circuit, the fingerprint signal is outputted, as the fingerprint input is thereby inputted through the fingerprint shield 55. While this image sensor picks up the fingerprint input and feeds it into the signal-processing circuit, this fingerprint input is thereby generated into the fingerprint signal with respect to the signal processing circuit, and associated components.

After describing the processing of this fingerprint signal, the embodiment will now be described in detail below. A first unit switch 34 is activated beneath the shield 55 via a door handle 5, and in FIG. 14B. A second unit switch 35 is setoff also, as the shield 55 is pushed when inputting a real fingerprint. The transmitter 48 keeps the fingerprint signal in a fingerprint memory 21 when the shield 55 has ben pushed. A driver's door 4 conceals this transmitter 48, and the video recorder R whereby, defined as the input system including the shield 55. The transmitter 48 has an antenna 26 to transmit, and receive radio signals as the transmitter 48 is setoff. A modem 24 is included for demodulating received unit signals, and produces output signals so as to be transmitted about the source of the fingerprint input thus inputted. A unit signal detector 25 is for detecting the unit signal demodulated from this modem 24. Further, a fingerprint signal generator 22 is for, so receiving the fingerprint signal from the fingerprint memory 21. The fingerprint signal is thereby, outputted from the fingerprint signal generator 22 up to the modem 24, after the unit signal is detected. Lastly, a dispatcher oscillator 23 is to output a dispatcher signal due to the course of this fingerprint signal being transmitted via this transmitter 48.

As a rule, a controller 60 within a vehicle defines the antennas 27, 28, and 29 all of which are provided such as to transmit, and receive radio signals using this transmitter 48. A modem 31 demodulates signals received so as to produce output signals to be transmitted to the transmitter 48, thus, regarding the laws by which the unit signals are transmitted.

An oscillator 30 is included to output a dispatcher signal, one CPU 40A to control a fingerprint system, a memory 37 for storing a preset fingerprint signal, and whenever this fingerprint signal matches with the preset fingerprint signal being determined, thereby the CPU 40A, a transistor Q1 is now triggered. A coil of a relay 43 is hot by this transistor Q1 being turned on. Further, this relay 43 is connected to many automotive devices, such as a door-lock device, trunk opener, usual power windows, heater, hood opener, and a steering lock device. A coil 45 of an actuator is for freeing a door-lock, only of a user's seat section and a coil 44 of an actuator is for freeing a door-lock of a commuter seat section, since the steering locks via a timer, only, when the vehicle is parked.

Now, a coil 46 regarding an actuator is for causing the LED to, thereby, provide illumination for the fingerprint input shield 55. On the other hand, when the relay 43 is hot both door-locks are freed and the LED is activated, since the unit switch 35 is connected to the input terminal of this CPU 40A. As the switch 35 is joined to the CPU 40A and is setoff via the shield 55, a path is provided by which current flows, thus, concerning a resistor R2. Now, the CPU 40A can compare the tracing extremity of the input fingerprint signal induced as the unit switch 35 is set off, i.e. for fingerprint entry.

Figure 6:
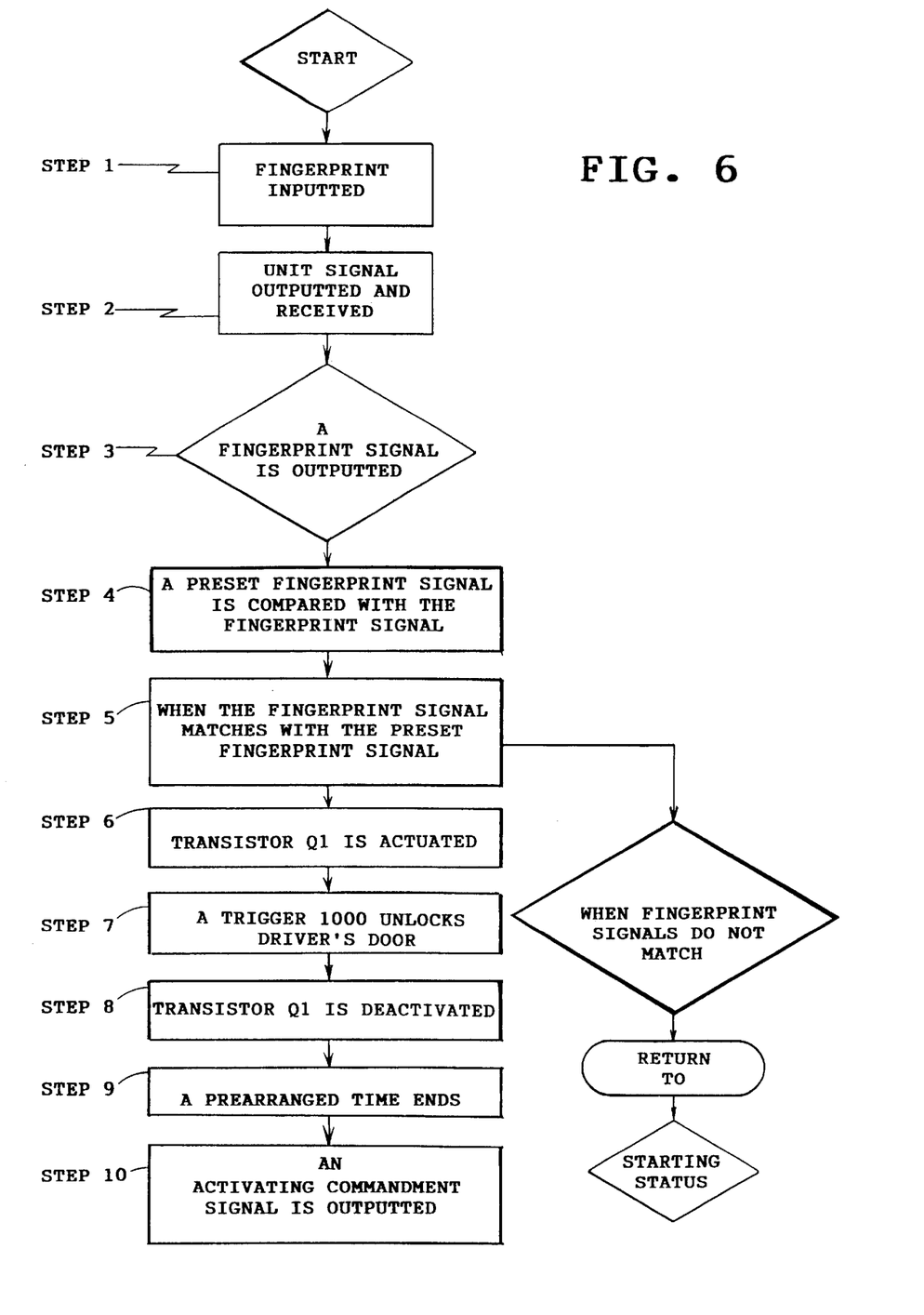
FIG. 6 has a flowchart for describing a fingerprint input pushbutton order with respect to associated components.

According to the first embodiment, this fingerprint operated ignition switch system will now be described in more detail by FIG. 14B and a step-by-step flowchart shown in FIG. 6. Step 1, the unit switch 35 is setoff, as the input shield 55 is inputted with real fingerprints by a user. Step 2, the unit signal is transmitted from the antennas 27, 28 and 29 to the antenna 26, which is found in the secured transmitter 48. This transmitter 48, and the recorder R are turned on via the shield 55 setting off the unit switches 34 and 35 (FIG. 14A).

Since the unit signal is received by the antenna 26 about the transmitter 48, the unit signal detector 25 detects the unit signal, as the fingerprint signal is probed from the fingerprint memory 21 to the fingerprint signal generator 22. In step number 3 the fingerprint signal is outputted from the fingerprint signal generator 22 up to the modem 24. Besides, the modem 24 receives a dispatcher wave which is produced via the dispatcher oscillator 23. This overlays this fingerprint signal via the dispatcher wave for forming a radio signal, so that the fingerprint signal travels upon the dispatcher wave. Whenever the modem 24 transmits the fingerprint signal by the antenna 26 to these antennas 27, 28 and 29, the preset signal is studded out from the fingerprint memory 37 to the CPU 40A. In step 4 the CPU 40A utilizes the memory 37 and compares the fingerprint signal from the transmitter 48 using the antennas 27, 28, and 29 with the preset fingerprint signal.

In step 5, when the fingerprint signal matches with this preset fingerprint signal, the transistor Q1 is actuated in step 6, as the relay 43 is hot such that the current flows via the coils 44, 45 and 46 concerning the LED, this triggers the door-locks, as this LED emits light. Now when a match is not decisively defined by the CPU 40A about these fingerprint signals, the fingerprint system returns to a starting status.

These door-locks are triggered while this LED emits light, when a legal user inputs true fingerprints through two triggers 1000–1001 by the shield 55. This unlocks the door 4 in step 7 such that a user can enter the vehicle. In step 8, this transistor Q1 is deactivated through the timer, which is activated, and starts clocking a prearranged time, when such, prearranged time has ended which is roughly, 25–30 seconds in step 9. Briefly in process of time the foregoing LED and the actuators are turned off as well. The steering lock is thus, released only, as a user inputs real fingerprints through the shield 55 such that the engine triggers 2000–2001 is pressed. This causes an engine starter to be driven, when the triggers 2000–2001 set off the first unit switch 34.

In step 10 the CPU 40A outputs a commandment signal as the fingerprint signal mates the preset fingerprint signal stored in the memory 37. The vehicle now will be referred to as "EZEKIEL" with respect to a reference name concerning this unique invention, which is presented to applicant from (GOD). Now, a starter motor SM (see FIG. 10) for causing this engine starter to be driven is activated via the commandment signal.

As shown in FIG. 10, the starter motor SM is, thus, connected to the switch 34 as the recorder R is provided with an adaptor (ADA) so as to connect to a 12 V DC source 12, one output cable 0 is connected via the input terminal of the CPU 40A. Since two leads 50, and 51 are connected to the starter motor SM, as leads 56, and 57A each of which is connected via the 12 V DC source 12, all remaining leads 52, 53, 54 and 55A each of which is coupled with respect to this unit switch 34. The recorder R can be operated from the ADA or will charge up its batteries while recording fingerprint input, since the 12 V DC power supply voltage via "EZEKIEL" is lowered, or raised according to the operating voltage concerning the recorder R. As the switch 34 is connected to the CPU 40A, the antennas 27 to 29 will transmit the unit signal to the transmitter 48, as the engine triggers 2000 and 2001 of the shield 55 is pressed upon the pushbutton 3b. This causes the starter motor SM to drive the starter via the commandment signal, since the transmitter 48 answers the unit signal by transmitting the fingerprint signal. A resistor R1 is provided on the switch 34 in the same manner, as set forth above about modification, one transistor Q2 is provided also.

Figure 7:
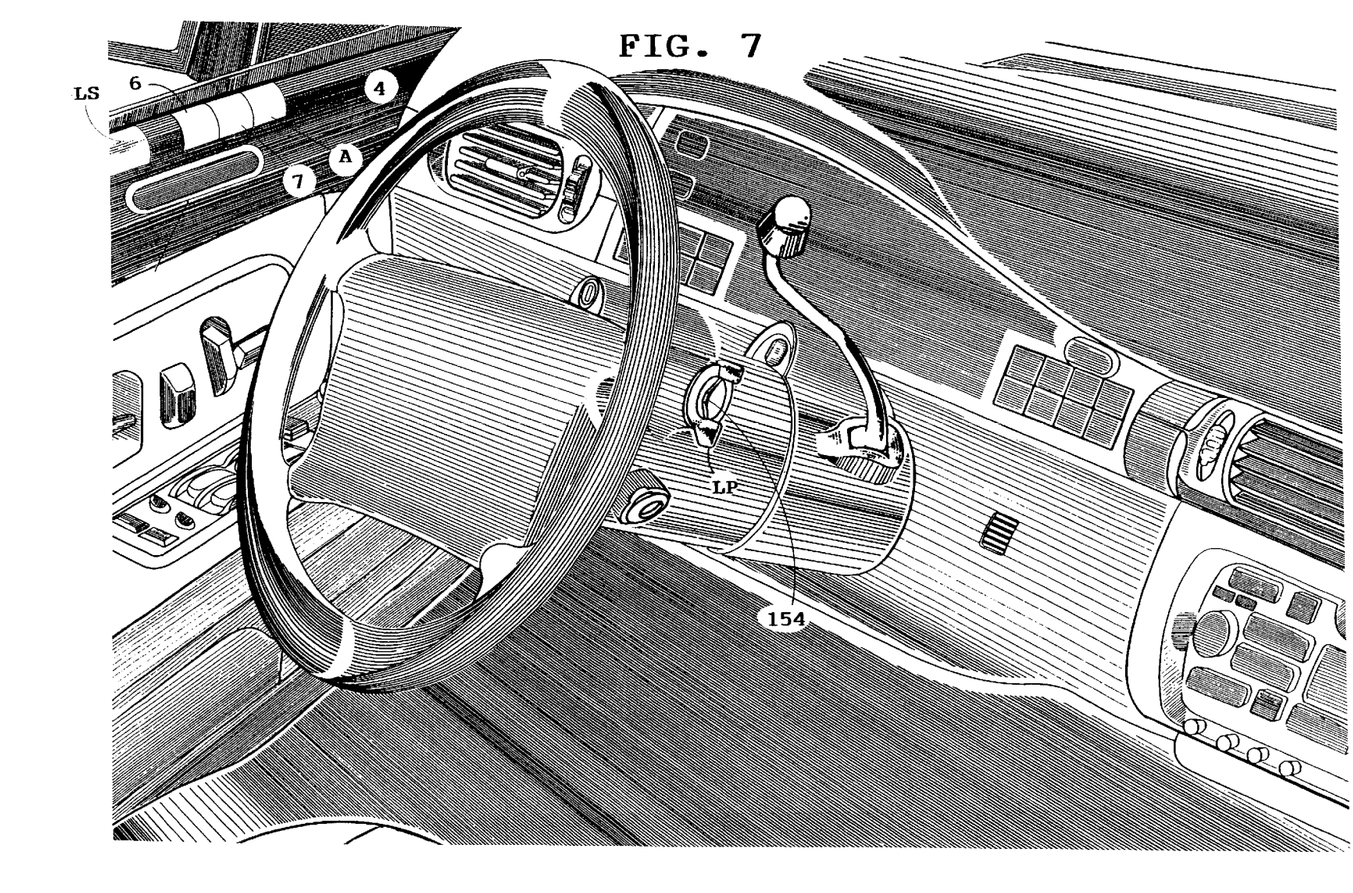
FIG. 7 shows a locking column with an input system.

An ignition (IGN) switch 154 shown via FIG. 7 about a locking portion LP, as shown via FIG. 1 is, only, turned on when a match is determined by the CPU 40A. Thus, the starter motor SM is actuated and a starter relay 42 is hot, only when a match is determined by the CPU 40A, since the transistor Q2 is for starting "EZEKIEL'S" engine, when the relay 42 is hot. As a result, via this construction, the commandment signal is outputted, then 12 V DC electric current concerning "EZEKIEL" flows through the ignition switch 154 from the 12 V DC source 12, when a match is compared and determined by the CPU 40A.

Now, this activates this ignition switch 154, which triggers the starter motor SM, as set forth in the foregoing, thus, concerning the prearranged time about the modification. Now, the transistor Q2 is turned off, such that the operation returns to a starting position, since the recorder R includes a rewind feature, so, as to bring its tape back to a starting position before being turned off.

Referring to FIGS. 2 and 8 regarding "EZEKIEL," the transistor Q2 is engineered to start "EZEKIEL'S" engine, when the foundations about the transistors Q1, and Q2 are thereby, connected to the output terminals of this CPU 40A. Now, this adjacent transistor Q1 is for thereby freeing the door-locks, while this starter motor SM, the IGN switch 154, and an (ACC) accessories A, such, as a clock, power windows, radio, or the like are actuated only, when the transistor Q2 is turn on and a coil of the relay 42 is hot.

The collector via the transistor Q1 is connected to the hot coil of the relay 43. This collector is connected to a collector bias source Vcc of the CPU 40A. Now, the emitter of the transistor Q1 is grounded, and an end of the coils 44, and 45 via actuators for unlocking the doors of "EZEKIEL" is, thus, connected to a line of the collector bias source Vcc as the opposite end is grounded by the relay 43.

As the transistor Q1 is energized, the coil of this relay 43 is hot, such that electric current flows through the coils 44, and 45, which unlocks "EZEKIEL'S" doors. Thus, the collector of the transistor Q2 is connected to the coil about the relay 42, and the collector is connected to the collector bias source Vcc.

The emitter of the transistor Q1 is grounded, and a line of the coil 46 of actuator, such, as to cause the engine starter to be driven is coupled to this collector bias source Vcc, while the other leads are grounded through the relay 42.

The LED is connected via this collector bias source Vcc, whereby the other leads are grounded using the relay 42. As the transistor Q2 is actuated from legal fingerprint input and a match is defined, the coil of the relay 42 is hot, such that electric current flows through the coil 46, and the LED. The internal combustion engine of "EZEKIEL" is started as the LED illuminates this fingerprint input system via the door 4, and the door handle 5, as the triggers 2000–2001 are pressed.

Further, when the engine trigger 2000 is pressed by a legal user, when the engine is functioning and "EZEKIEL" is parked, the commandment signal is outputted from the CPU 40A. As a result, this commandment signal triggers an off position about an on/off load of the ignition switch 154, which, thus, turns off the engine of "EZEKIEL."

Second Embodiment

This second embodiment includes different reference numerals and letters except for, whenever comparable elements are used from the first embodiment regarding the modification herein, with respect to all corresponding elements.

Figure 11:
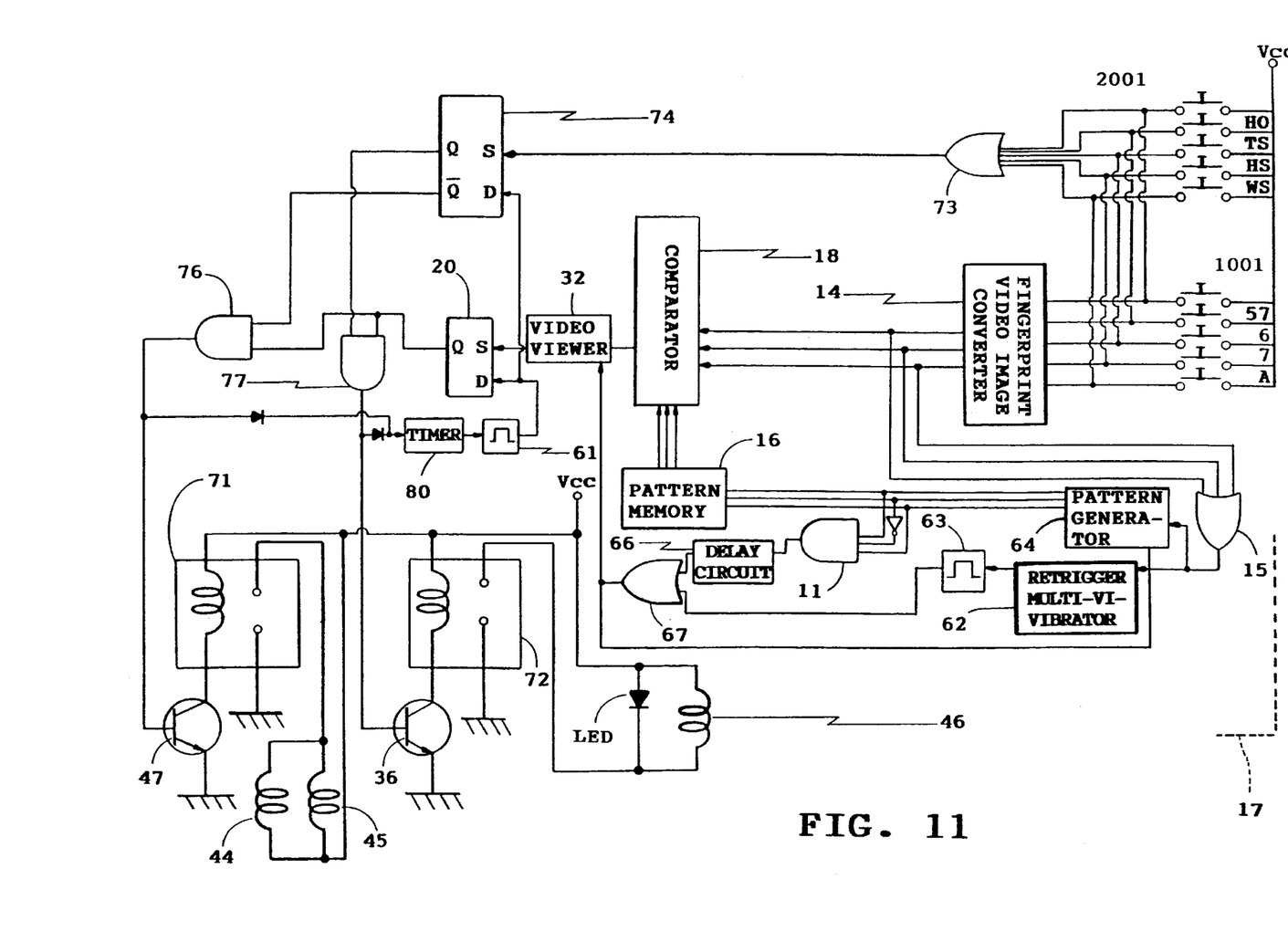
FIG. 11 is a block diagram describing the circuitry control regarding elements of the vehicle, and its system via the Second embodiment of a dashboard, and ten input switches.

Referring to FIGS. 2, and 11, the second embodiment having an input dashboard shield switch 57, its enter, delete and (ACC) fingerprint switches 6, 7 and A for performing each operation as follows: the fingerprint input pushbutton shield switch 57 is to be triggered by a user for turning on a video recorder J (not shown), which is in "EZEKIEL'S" dashboard for changing optical information to computer data, so as to start the engine of "EZEKIEL." This fingerprint enter input switch 6 is for entering data of a transit user into the fingerprint operated IGN switch system. Now the fingerprint input delete switch 7 is for deleting this data of a transit user, and the ACC switch A actuates the accessories which are controlled by the IGN switch 154, conventionally, shown in FIGS. 1 and 7.

Figure 12:
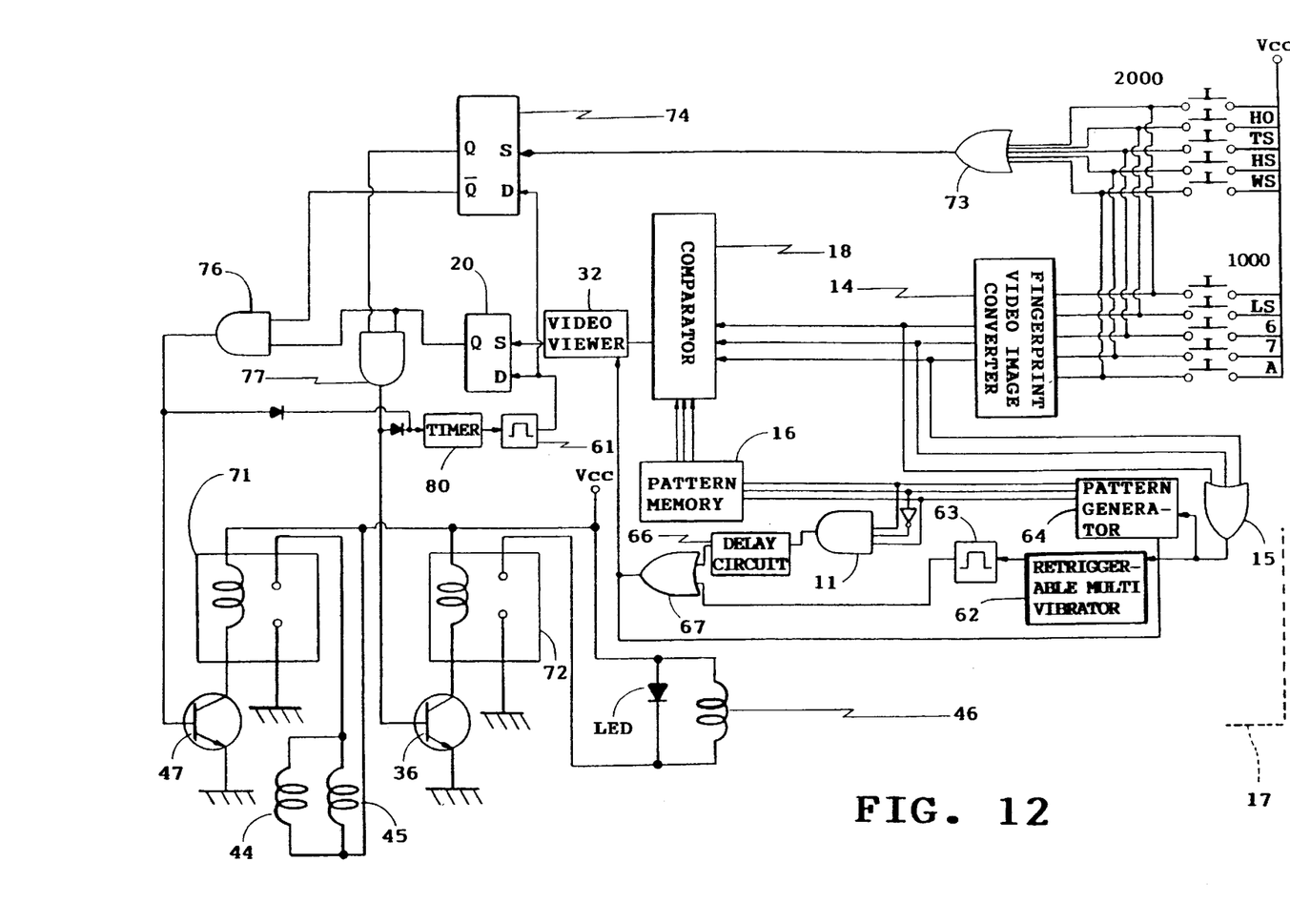
FIG. 12 is a block diagram describing the circuitry control, and elements of this vehicle having its input system on its inner door, and ten switches in the second embodiment.

Referring now to FIGS. 3, and 12, a more affordable system has an input pushbutton LOW BUDGET SHIELD SWITCH (LS). The switch LS has a fingerprint shield secured in the vehicle "EZEKIEL" upon the door 4, such, as to input fingerprint data optically through the system by the recorder R. As a result, the engine of "EZEKIEL" is started as set forth above.

With respect to this construction, the input shield switch LS is to be setoff while being pushed by a legal user, actuates the recorder R in the same manner, as when the input shield 55 is being pressed. Generally, this shield switch 57 including this recorder J, consequently, is excluded from all vehicles employing the LS system since the input computerized video recorder R, thus, provides fingerprint entry and engine starting prudently. Besides, the column 40 conceals this IGN switch 154 (not shown), however omitting the extended locking portion LP, as shown in FIG. 1.

The input shield LS, its enter, delete and ACC push button switches 6–7, and A are adjacent close range shooting, however, above the recorder R, and in the same manner, as the shield switch 57 and its auxiliary input pushbutton switches. The shield LS is only in vehicles omitting the switch 57, and this shield 57 is, only, in vehicles excluding the shield LS, since "EZEKIEL" defines a controller 17 about the fingerprint operated IGN switch system, such, as to control ten switches.

Referring to FIGS. 5, and 11, the door 4 includes a hood, trunk, heater and window fingerprint push-button system outwardly above the shield 55 to input data. The fingerprint input is recorded through a clear inward structure, when each pushbutton control is pressed, actuates four switches. E.g., one hood switch HO actuates the hood opener, one switch TS is for triggering the trunk opener, one switch HS is for turning on the heater, and one switch WS is for operating this window control before entering through "EZEKIEL'S" remote door 4.

Referring to FIGS. 11 and 12, one fingerprint video image converter (FVI) converter 14 is for, thereby converting signals outputted, which are produced while fingerprint input is inputted through the recorders J and R for setting off all switches from 2001 to A. An OR-gate circuit 15 is, such that a logical amount of input signals are thereby, generated from the (FVI) convertor 14, a video pattern generator 64 includes a clock for driving a counter chain. Besides, this addresses a preprogrammed video pattern memory 16 (PVPM) for generating a video waveform. Now this outputs address signals regarding the output signals from the FVI convertor 14, and this memory 16. Further, this controller 17 includes a comparator 18, so as to compare all output signals characterizing data from the FVI convertor 14. Now, when all output signals characterized by data from this memory 16 are outputted, a high-level logic signal is outputted also, when the output signal from the FVI convertor 14 matches the output from the output signal within this memory 16. A video negative viewer 32 inverts the video of the fingerprint input, while producing a negative image on the video of the fingerprint signal, so as to match with this output signal from the memory 16. A D type reset S flip-flop circuit 20 is set by the output signal via the video negative viewer 32. This outputs the commandment signal so as to turn on a transistor 47, as a timer 80 is to time a preset time by which the flipflop circuit 20 outputs the commandment signal.

When the preset time is ended on this timer 80, the transistor 47 is turned off, and a one shot multi-vibrator 61 is actuated. The flipflop 20 is reset via this transistor 47 being turned off, and a retriggerable multivibrator 62 is now activated in reply to the output signal of the OR-gate 15. A one-shot multi-vibrator 63 is for outputting one pulse signal about this preset time of the tracing extremity via an output signal thus, of the multi-vibrator 62. As the one-shot multi vibrato 63 resets the video negative viewer 32 thus utilizing the OR-gate 15, when the preset time is ended, an AND-gate 11 circuit is included which produces an output that is logical. A delay circuit 66 is to delay the output signal via this AND gate 11 about this preset time. Thus, an OR-gate 67 produces a logical amount of input signals from the output of this one shot multi-vibrator 63, thereby, including the output of this delay circuit 66. Moreover, when the video pattern generator 64 outputs an address signal figurative about the fingerprint signal outputted from the FVI convertor 14 and the memory 16, a high level logic signal is outputted by the AND-gate 11, as the delay circuit 66 so receives the high-level logic signal. This is also, received by the OR-gate 67, and is accomplished only, when the preset time has ended. Now the video negative viewer 32 is reset, when the output signal via the OR-gate 67 is outputted. Electric current flows by the coils 44, 45, 46 and the LED via a relay 71, when the transistor 47 is set-off for answering the output signal from the flipflop circuit 20.

Moreover, the input fingerprint pushbutton controls located on the outer door 4, which, when inputted via a user, now, activates the hood opener, the trunk opener, the heater, and the window control system, whereby, this LED emits light. Door lock actuators are actuated regarding a switch 1001 when its trigger 1001 is inputted for providing fingerprint entry. The fingerprint input switches are setoff about the dashboard also. As the memory 16 includes a system for storing data of a transit user, while a transit user presses the shield 55, a legal user presses the fingerprint enter pushbutton switch 6. Each fingerprint input both of which becomes computer data by the image sensors, signal circuits and associated components. Now, this fingerprint data both of which are compared via the comparator 18, as set forth above, and when the output signal from this FVI convertor 14 matches the output from the output signal of the memory 16, a signal of a transit user is stored in the memory 16. Now, this flip-flop circuit 20 outputs the commandment signal, after being set by the output signal from the video negative viewer 32, the commandment signal actuates the timer 80. This timer 80 starts clocking a preset time to delete the data of a transit user, as an image of the data of a legal user is generated via the viewer 32 alone. While the input switch 7 deletes all transit data, the delete switch 7, when pushed by a legal user deletes data about a preset time. The preset time to delete data of a transit user is 3 second, after the data about a legal user are generated via the video negative viewer 32 with respect to a singular negative image.

When a user enters "EZEKIEL" by pressing the switch 1001 about the door handle 5, outputs the fingerprint signal. The FVI converter 14 converts the fingerprint signal from the recorder R, which goes to this comparator 18. This signal is sent through the OR-gate 15, and further to the video pattern generator 64. The video pattern generator 64 utilizes 43,605 pixels, such that each pixel can be programmed since a switch provides a choice of patterns such as a custom pattern of the fingerprint signal. This pattern generator 64 addresses this memory 16 by an address signal in reply to fingerprint input, as a user operates this switch 1001. Now, a preset signal is outputted from the memory 16 to the comparator 18 so that the comparator 18, thus, compares the fingerprint signal from the FVI converter 14 with the preset fingerprint signal, and from the memory 16. When the fingerprint signal matches with this preset fingerprint signal, a twofold signal is outputted from this comparator 18. As the negative image of the fingerprint signal matches this preset fingerprint signal from the memory 16, as the comparator 18 outputs the preset signal, the video negative viewer 32 outputs the commandment signal.

The commandment signal is outputted to the flipflop circuit 20 since the flip-flop circuit 20 is set on the basis of this commandment signal. This flip-flop 20 outputs a high level signal by a terminal Q to the bed of the transistor 47, so that the transistor 47 is turned on, since the relay 71 is hot, electric current flows by way of these coils 44, 45, 46, and the LED. Now, the engine of "EZEKIEL" is started since a user pushed the input shield 57. The fingerprint input enter and delete switches 6–7, and this dashboard ACC switch A will perform each operation, while being operated by a legal user.

Now when the LED emits light after being activated, the timer 80 starts timing the prearranged time, as set forth in the foregoing. Besides, all of the foregoing controls are supported via five switches, as follows: 1001, 57, 6–7, and A regarding this construction. As the remaining input switches 2001, HO, TS, HS, WS, and the switches 1001 to A are included as ten fingerprint input manual switches, the input switch LS is omitted. Since the construction of the switch LS includes ten switches, also, the shield switch 57 is excluded as well.

Figure 9:
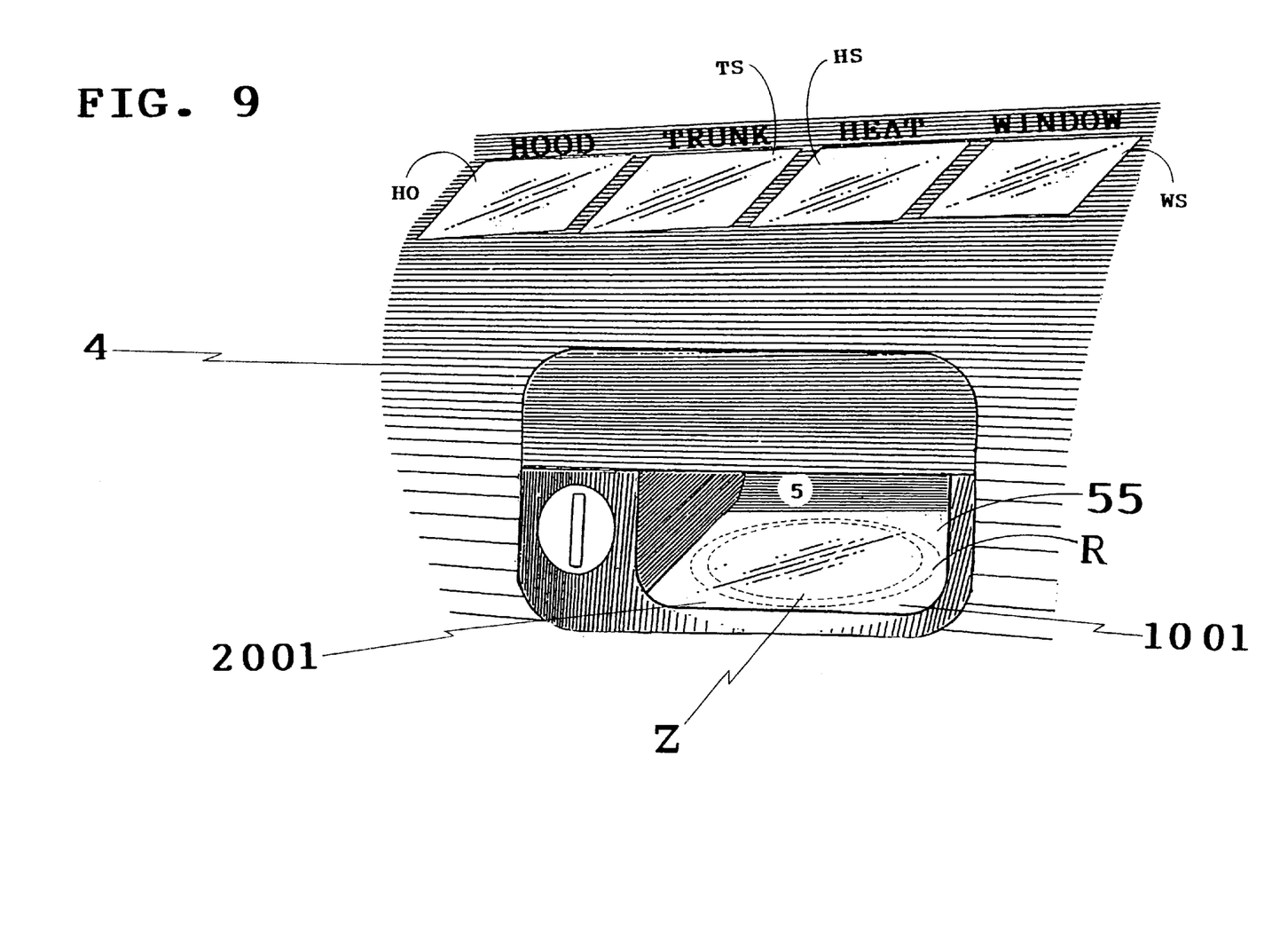
FIG. 9 is a perspective view via a door handle with the input shield on two unit switches to start the engine and provides entry, which is set forth via the Second embodiment.

Referring to FIGS. 9, and 11, an OR-gate circuit 73 is connected to a S terminal of a flip-flop circuit 74, since the switches 2001-WS are connected by way of this OR-gate 73. While the bases of the transistor 47, and a transistor 36 are connected to an output terminal of an AND gate 76 and 77, the flip-flop 74 is set by the output signal from the OR-gate 73. Now, the transistor 47 is for freeing the door-locks, as this transistor 36 is for starting the engine of "EZEKIEL," and to energize the LED. Since the collectors of the transistors 47 and 36 are connected to a hot coil of the relay 71 and a coil about a relay 72, the collectors are connected to a collector bias source Vcc, as the emitter of the transistors 47, and 36 are grounded. As a lead via the coils 44–45 of actuators for freeing these door-locks are connected to this collector bias source Vcc, the other lead is grounded via this relay 71. As a lead via the coil 46 of the LED is coupled to the collector bias source Vcc, the other lead is grounded via the relay 72.

As this output terminal Q via the flip-flop 20, and one output terminal Q to invert the flipflop circuit 74 while connected to the two input terminals via the AND-gate 76, the two input terminals of the AND-gate 11 are connected to these output terminals Q of the flipflop circuits 74 and 20.

Thus, the high level signals are outputted from the output terminal Q, and the Q of the flipflop 20 and 74 to the AND-gate 76 simultaneously, as the fingerprint signal matches via the preset fingerprint signal in reply to the fingerprint input switches 1001, WS, HS, TS, and HO. An output signal is outputted from this AND-gate 76 to the transistor 47, so that the transistor 47 is turned on, as the relay 71 is hot. Now, the door-locks are freed, as a legal user presses the trigger switch 1001. The switches HO to WS all of which will perform their operations, as set forth above by basis on modification of this remote construction. When a user inputs fingerprints through this engine trigger switch 2001, before entering this vehicle "EZEKIEL," a legal user will, also input fingerprints using the shield switch LS while seated in the driver's seat. This is accomplished only when the fingerprint signal matches with the preset fingerprint signal, as the high-level logical signals from the output terminals Q via the flipflops 74, and 20 are received by two input terminals about the AND-gate 77. Also, as an input terminal of this AND-gate 76__receives a low level logical signal from the output terminal Q via this flip flop 74. Now the AND-gate 77 outputs an output signal to the transistor 36 to start the engine of "EZEKIEL" via the engine trigger switch 2001. This LS shield switch will, also, start the engine of "EZEKIEL" about this AND-gate 77 for outputting an output signal to the transistor 36 as the LED emits light.

While the above description contains many specifics of which should not be construed, as limitations on the scope of the invention, many variations and modifications will thus be apparent to persons skilled in the art. E.g., fingerprint banking is defined by a computer specialist, which can occupy a room with computers. The room can be designed, so that the computerist can view all windows opened for service, when the direct handling of money received or paid out with respect to deposits, and withdrawals are such that a fingerprint banking calculator is to be utilized. On the other hand, any account holder can calculate any amount of which is so requested, and then, press a fingerprint banking shield, which will energize an electric transmitter and a video recorder, simultaneously. The recorder will record the account holder's fingerprints as this transmitter transmits a signal about them to a memory in which a computer via the foregoing room analyzes. While this transmitted fingerprint signal matches with one preset signal stored in the memory, this account holder's account number on a faxed bank statement is provided for the account holder, as this computerist views all evidence on the computer's screen. The invention will provide fingerprint entry in condominiums, housing developments, homes, apartment houses and businesses. Now twenty four hour fingerprint banking can be provided, and an ACC input switch, a radio and compact disc CD switch, also can be provided on the outer door regarding fingerprint input via this "Broadening paragraph" (FIG. 13). Wisdom dwell with prudence and find out knowledge of witty inventions Proverbs. A construction as shown in FIGS. 14A to 14B can substitute or replace the construction shown in FIG. 5, since each of those constructions both of which are water proof.

I claim:

1. A keyless fingerprint operated lock and ignition on a driver's door of a vehicle, comprising:

an input shield (55) mounted on the exterior side of said door (4) for placement of a driver's finger;

a first switch (34) activated by depressing a first part of said shield (2000/2001), a second switch (35) activated by depressing a second part of said shield (1000/1001), and a third switch (3b) activated by depressing either part of said shield (1000/1001, 2000/2001);

an image sensor (R) mounted proximate said shield (55) for capturing an image of a driver's fingerprint when placed on either part of said shield (1000/1001, 2000/2001);

a transmitter (48) proximate said shield (55) and activated by said third switch (3b), where upon activation, the transmitter storing said fingerprint image (21) from said image sensor (R), detecting signals (25) from said first or second switches (34, 35), and transmitting (26) said fingerprint image upon said detection;

a controller (60) receiving (27, 28, 29) said fingerprint image from said transmitter (48), receiving signals from said first or second switches (34, 35), and comparing said fingerprint image with a preset fingerprint in a memory (37), and when said fingerprints match, the controller (60):

activating the vehicle ignition (42) starting the vehicle when a signal is received from said first switch (34), or unlocking said door (43) when a signal is received from said second switch (35).

2. A fingerprint operated ignition switch system as defined in claim 1, wherein said transmitter (48) is mounted in said driver's door (4) near said image sensor (R).

3. A fingerprint operated ignition switch system as defined in claim 1, wherein said image sensor (R) is fixed erectly below said shield (55), said shield (55) is set in a door handle of said vehicle.

4. A fingerprint operated ignition switch system as defined in claim 1, where said controller (60) comprises three antennas (27, 28, 29) for transmitting and receiving signals to and from said transmitter (48).

5. A fingerprint operated ignition switch system as defined in claim 1, wherein said controller (60) comprises a CPU (40A), said CPU (40A) performing said activation of said ignition (42).

6. A fingerprint operated ignition switch system as defined in claim 5, wherein said CPU (40A) activates said ignition (42) before said doors are unlocked.

7. A fingerprint operated ignition switch system as defined in claim 5, wherein said CPU (40A) activates said door lock (43).

8. A fingerprint operated ignition switch system as defined in claim 7, wherein said CPU (40A) activates said door lock (43) before activating said ignition.

9. A fingerprint operated ignition switch system as defined in claim 1, wherein said shield (55) is fixed in a mid door location.

10. A fingerprint operated ignition switch system as defined in claim 1, wherein said controller (60) activates said ignition. (42) to start said vehicle before said doors are unlocked.

11. A fingerprint operated ignition switch system as defined in claim 1, wherein said controller (60) activates said ignition (42) thereby starting said vehicle without the use of a key.

12. A fingerprint operated ignition switch system as defined in claim 1, further comprising four additional switches (HO, TS, HS, WS) on the said exterior of said door for powering a hood, a trunk, a heater and a window.

13. A fingerprint operated ignition switch system as defined in claim 1, further comprising a fourth switch (154) to turn off the vehicle ignition when the vehicle has its gear indicator in park.

14. A fingerprint operated ignition switch system as defined in claim 1, wherein said preset fingerprint memory (37) stores a driver's fingerprint for comparison.

15. A fingerprint operated ignition switch system as defined in claim 1, wherein said preset fingerprint memory (37) stores a transit user's fingerprint for comparison.

16. A keyless fingerprint operated lock and ignition on a vehicle door, comprising:

a fingerprint sensor mounted on the exterior side of said door for placement of a person's finger; said sensor having a first finger placement surface for unlocking a door, a second finger placement surface for starting said vehicle, an image sensor capturing a fingerprint image when a finger is placed on either of said surfaces, and a transmitter for transmitting said fingerprint image;

a vehicle mounted controller receiving said transmitted fingerprint image, comparing said image with a previously stored fingerprint of a person authorized to use said vehicle, and when the comparison yields a match, said controller activating an actuator for unlocking said door when said first finger placement surface is pressed, and activating an actuator for starting said vehicle when said second fingerprint placement surface is pressed.

* * * * *